United States Patent [19]
Morris et al.

[11] 3,875,036
[45] Apr. 1, 1975

[54] PROBE AND AGITATOR SYSTEM

[75] Inventors: George V. Morris, Riverside, R.I.;
Gilbert E. Anderson, Fall River, Mass.

[73] Assignee: Raytheon Company, Lexington, Mass.

[22] Filed: Jan. 2, 1974

[21] Appl. No.: 430,273

[52] U.S. Cl. ............. 204/195 P, 204/273, 204/279, 259/8
[51] Int. Cl. ............................ B01f 7/16, B01k 3/00
[58] Field of Search ............ 204/1 T, 195, 273, 279; 259/8; 324/29

[56] References Cited
UNITED STATES PATENTS
3,275,541  9/1966  Strong .............................. 204/195 P
3,496,084  2/1970  Stack, Jr. ......................... 204/195 P

*Primary Examiner*—G. L. Kaplan
*Attorney, Agent, or Firm*—David M. Warren; Joseph D. Pannone; Milton D. Bartlett

[57] ABSTRACT

A probe and agitator system for obtaining electrical measurements in a fluid medium. An agitator positioned adjacent a sensory surface of a probe has an arcuate edge homothetic to an axial cross-section of the sensory surface and is spaced apart from the surface. A surface of the agitator is flared outwardly from the arcuate edge and is provided with two indentations or pockets diametrically opposed and having one wall of each pocket which is planar and lies in a plane containing the axis of the agitator. The agitator rotates around this axis, and is positioned coaxially with the axis of the sensory surface. The agitator eliminates the build-up of scum along the sensory surface and within a cage containing the sensory surface and the agitator.

9 Claims, 8 Drawing Figures

PROBE AND AGITATOR SYSTEM

BACKGROUND OF THE INVENTION

Dissolved oxygen probes have been utilized in the measurement of dissolved oxygen in sewage effluent to monitor the decomposition of organic wastes and the effects of pollutants hazardous to the environment. Such a probe with an agitator cleaning the probe is disclosed in U.S. Pat. No. 3,496,084 which issued to V. T. Stack, Jr. on Feb. 17, 1970. Typically, the probe and the agitator are positioned together in a structure having ports for the admission of a liquid sewage to a sensing surface of the probe.

A problem arises in that the wide range of animal excrement, vegetable, plastic and mineral materials which are present in raw sewage induces the growth of slime or other such coating on the sensing surface of the probe. Such growth of scum and slime have the threefold effect of decreasing the amount of contact of the water of the sewage with the probe thereby providing a low reading of a dissolved substance such as dissolved oxygen, the entrapping of air bubbles thereby providing an excessively high reading of a substance such as dissolved oxygen, and the clogging of the supporting structure with the resulting jamming or impeding of the agitator motion as well as the impeding of the flow of sewage through the ports of the supporting structure.

SUMMARY OF THE INVENTION

The aforementioned problems are overcome and other advantages are provided by a probe and agitator system which, in accordance with the invention has an agitator positioned adjacent to, yet, spaced apart from the sensing surface of the probe utilized in the measurements of materials carried within the sewage, and more particularly a probe making electrical measurements of dissolved oxygen by means of an electrochemical reaction of the oxygen with an electrolyte within the probe. The agitator is positioned coaxially to the probe and is provided with a fin-like appendage or vane having a curved edge which meets with a curved surface of the sensory portion of the probe. This vane is situated at the apex of a flared conical surface of the agitator. The flared conical surface is provided with a pair of diametrically opposed pockets or indentations each of which has a straight side substantially parallel with the straight side of the opposite pocket, the bottom surface of each pocket being concave and extending outwardly in a gentle curve to join with the flared conical surface. A motor coupled via its shaft to the agitator is provided for rotating the agitator about its axis. A shroud assembly is positioned on the motor about the motor shaft in the preferred embodiment of the invention and is provided with a circular wall which encircles the agitator and extends approximately half way along the axis of the agitator. A supporting structure for the motor, the agitator, and the probe is provided with three ports circumferentially positioned about the agitator and separated by three struts which position the probe relative to the agitator. The relatively large area of the ports to that of the connecting struts plus the swirling action of the agitator moves the sewage water before the probe and against the shroud providing for a liquid flow that maintains the agitator, the supporting structure and the probe surface free of scumlike material.

BRIEF DESCRIPTION OF THE DRAWINGS

The aforementioned aspects and other features of the invention are explained in the following description taken in connection with the accompanying drawings wherein.

DESCRIPTION OF THE PREFERRED EMBODIMENT

Figure 1:
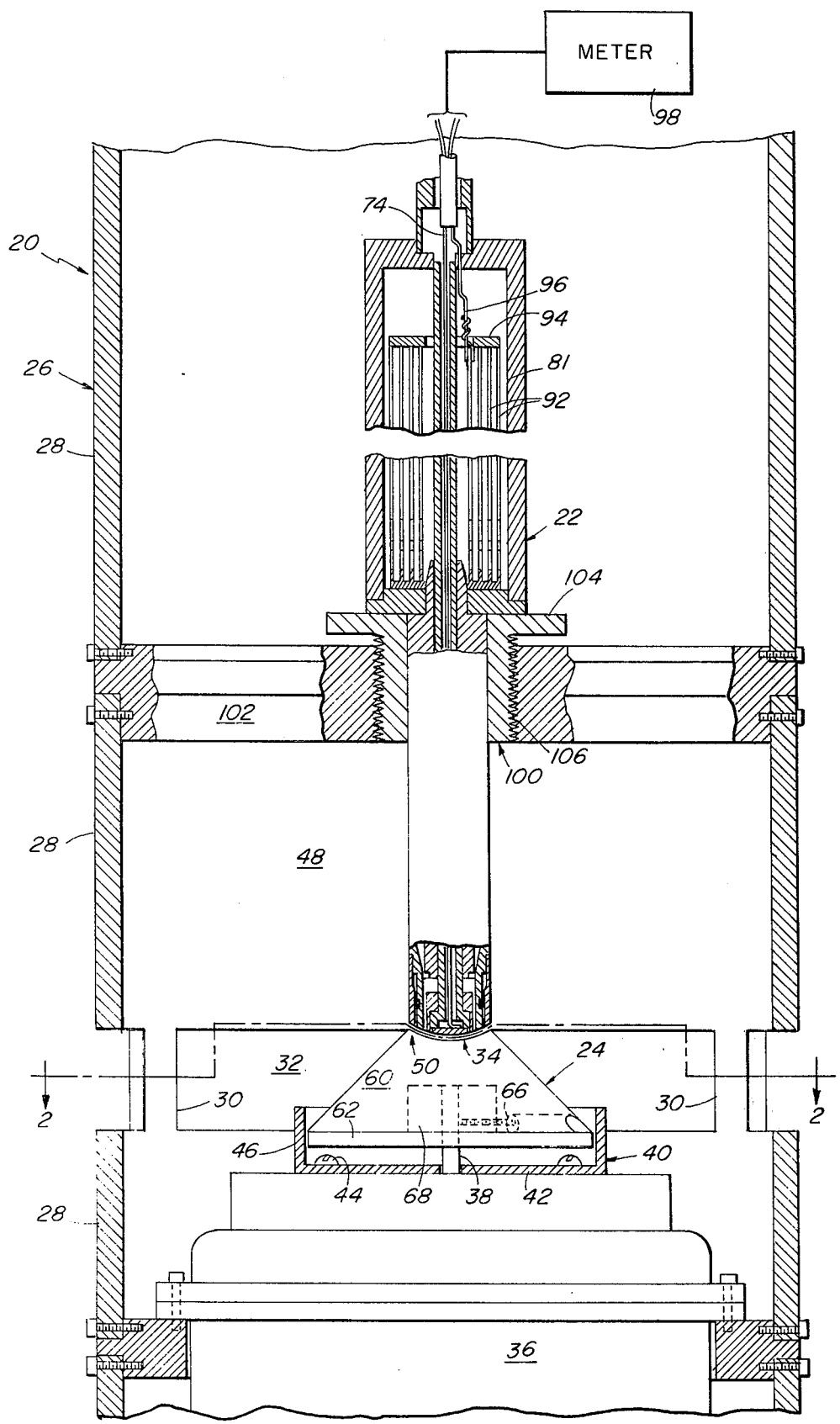
FIG. 1 is an elevation view, partially cut away and partially in section, of the agitator, probe and supporting structure of the invention.
Figure 2:
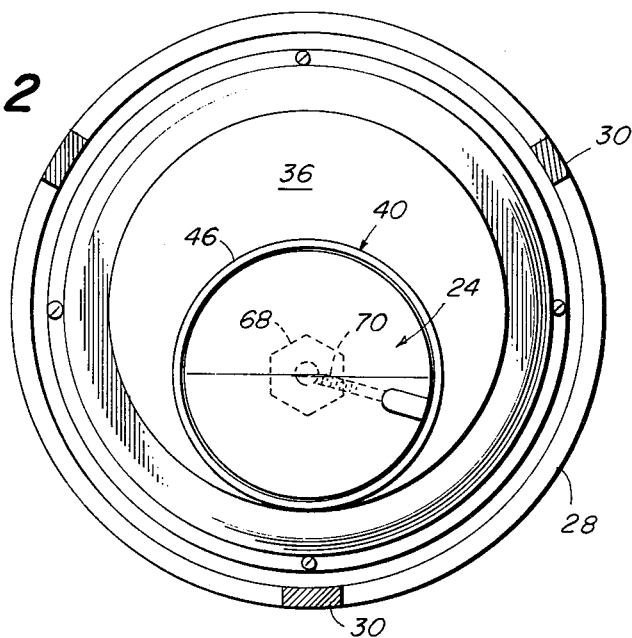
FIG. 2 is a sectional view of the structure of FIG. 1 taken along the lines 2—2.
Figure 5:
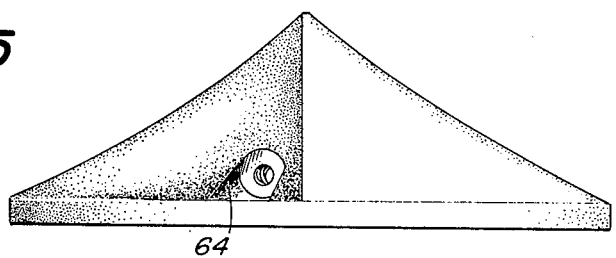
FIGS. 4 and 5 are elevation views of the agitator of FIG. 3 taken along the lines respectively 4—4 and 5—5.
Figure 6:
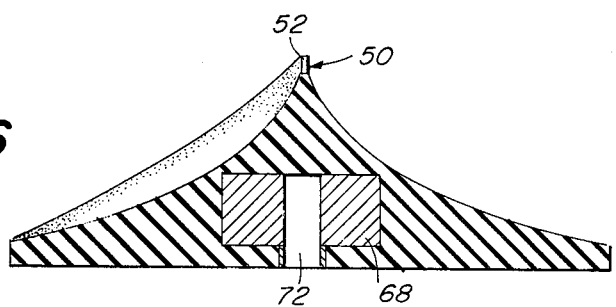
FIGS. 6 and 7 are sectional view of the agitator of FIG. 3 taken along the lines respectively 6—6 and 7—7.
Figure 7:
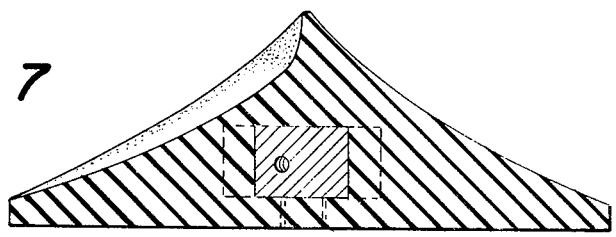
Figure 3:
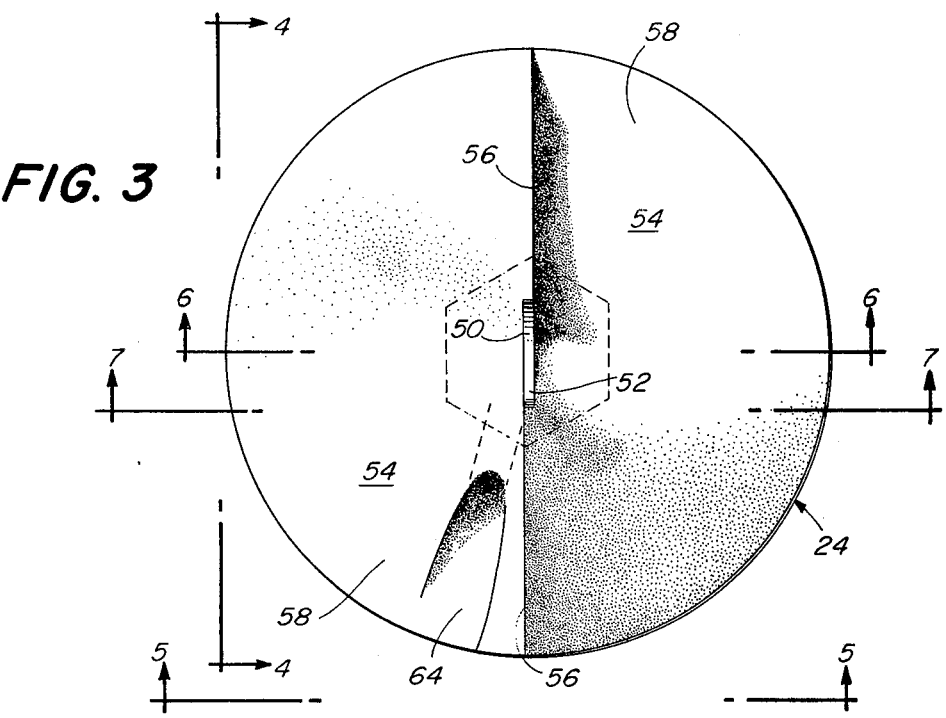
FIG. 3 is a plan view of the agitator of FIG. 1.

Referring now to FIGS. 1 and 2 there is seen an elevation view, partially cut away and partially sectioned, of a system 20, in accordance with the invention, for the positioning a probe 22 relative to an agitator 24 to maintain the region around the probe 22 substantially clean and free of scum. The probe 22 and agitator 24 are aligned along a common axis, and the sectioning of the view of FIG. 1 is taken along this axis to show interior portions of the probe 24. A supporting structure 26 positions the probe 22 relative to the agitator 24 and includes an outer case 28 and struts 30 defining ports 32 which allow the entry of fluid within the region of the sensing surface 34 of the probe 22. The system 20 is typically immersed in a raw sewage aeration tank for the measurement of a quantity of a specific substance contained within the sewage, the preferred embodiment of the invention being utilized in the measurement of dissolved oxygen. The motion of liquid sewage within the aeration tank (not shown) provides for a continuous flow of sewage materials through the ports 32 and past the sensing surface 34.

The agitator 24 is coupled to a drive unit 36 by means of a shaft 38, the drive unit 36 comprising a motor and gear box, the drive unit 36 being hermetically sealed for excluding sewage from the motor and the gear box. A shroud 40 encloses the lower portion of the agitator 24 and has a flat bottom 42 which is secured to the drive unit 36 by bolts 44 and has a central aperture whereby the shaft 38 passes from the drive unit 36 to the agitator 24. The shroud 40 has a circular wall 46 extending upwardly from the bottom 42 and partially enclosing the lower portion of the agitator 24. The height of the wall 46 is approximately one half the height of the agitator 24. The inner diameter of the circular wall 46 is slightly larger than the maximum diameter of the agitator 24 to permit free rotation of the agitator 24 without its binding upon the inner surface of the circular wall 46.

As seen in the cross-sectional view of FIG. 2, the agitator 24 is positioned near to one side of the case 28 in order to accommodate the gear box of the drive unit 36. Also seen in FIG. 2 are the struts 30 which, with the case 28, forms the boundary of a chamber 48 which is filled by the ports 32 with sewage.

A feature of the invention is the shape of the agitator 24 which is better seen in FIGS. 3-7 showing respectively a plan view, two elevation views taken along perpendicular planes, and two sectional views. Thus, it is seen that the agitator 24 has a generally conical shape which curves into a vane 50 at the apex of the agitator 24. The vane 50 has a concave surface 52 which is substantially homothetic to a cross-section of the sensing surface 34 of the probe 22 of FIG. 1. The agitator 24 is made preferably of a resilient material that is sufficiently stiff to retain its shape, an agitator of silicone rubber having been used in the preferred embodiment of the invention. The vane 50 serves to spin liquid sewage about the vicinity of the sensing surface 34 of the probe 22.

The agitator 24 is furthermore provided with a pair of concavities 54 positioned diametrically opposite each other and terminating on opposite sides of the vane 50. Each concavity 54 is provided with a flat wall 56 which wall becomes a side wall of the vane 50. The base 58 of each concavity 54 has an arcuate cylindrical form which is substantially normal to the wall 56.

Figure 4:
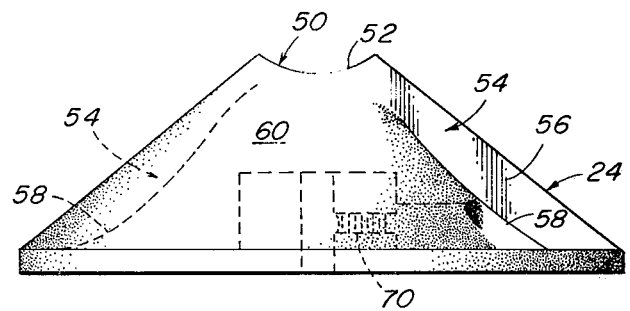

Referring to FIGS. 1 and 4, a feature of the invention is the use of the agitator 24 to prevent the build-up of gelatinous matter or scum with its attendant bacterial growth on the sensing surface 34 of the probe 22. The agitator 24 also prevents the attaching of air bubbles to the sensing surface 34.

In contradistinction to the aforementioned patent to Stack, the agitator 24 is spaced from the sensing surface 34 so that there is no physical contact between the vein 50 and the probe 22. Accordingly, it is seen that the vane 50 does not provide a wiping action as does the wiper blade of the Stack patent.

A further feature of the invention is the prevention of the entanglement of hairs and other fibrous materials about the shaft 38, such entanglement and jamming of impellers having been observed with systems of the prior art. The shroud 40 in combination with the flared conical surface 60 of the agitator 24 and the concavities 54 provide for a swirling action of the liquid sewage in the region between the surface 60 and the wall 46 which prevents the entry of fibrous materials below the lip 62 of the agitator 24. In this respect, it is noted that the agitator 24 spins in a clockwise direction, with reference to the plan view of FIG. 3, at a rotation rate of approximately 28,000 RPM (revolutions per minute). The rapid movement of the walls 56 causes the liquid sewage to spin and accelerate outwardly towards the wall 46. The wall 46 in turn directs the liquid sewage in an upward direction, whereupon it moves upwardly and inwardly towards the probe 22 and thereby circulates in a plane containing the axis of the shaft 38, as well as rotating in the plane perpendicular to the shaft 38. Accordingly, it has been found that the agitator 24 in combination with the shroud 40 is able to function unattended for many months without the entanglement of fibrous materials about the shaft 38.

In addition, there is a minimum number of struts 30, only three such struts having been used in the preferred embodiment, and a cage or chamber 48 of substantially larger size than the agitator 24 to minimize the entanglement of fibrous materials about the struts 30 and within the chamber 48. The shape of the agitator 24 thus minimizes the formation of the air pockets within the liquid sewage so as to prevent any false readings of the amount of dissolved oxygen present at the sensing surface 34.

The agitator 24 has symmetry about its axis of rotation except for a relatively small passageway 64 placed below one of the concavities 54 to permit insertion of a set screw 66 for attaching the agitator 54 to the shaft 38. The set screw is seen in FIG. 1 and insert 68 of a relatively hard material such as a metal or polyvinylchloride plastic material which is resistant to corrosion from sewage is seen in FIG. 4, the insert 68 being positioned within the bottom portion of the agitator 24. The insert 68 has a tapped hole 70 for receiving the set screw 68 and a central bore 72 for receiving the shaft 38. The insert 68 is of hexagonal shape for coupling the rotation of the shaft 38 to the agitator 24.

Figure 8:
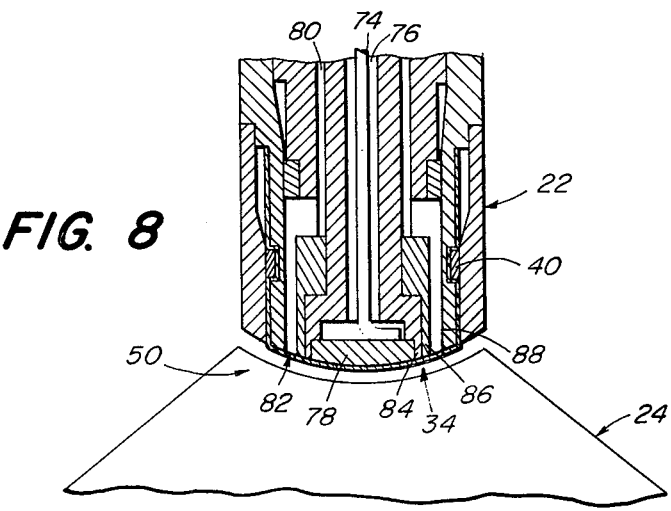
FIG. 8 is an enlarged view of the vane portion of the agitator of FIG. 3.

The probe 22 is seen in FIG. 1 and an enlarged view of the sensory portion thereof is seen in FIG. 8. The probe comprises the center conductor 74 positioned within a central bore 76 formed within a polyvinylchloride material of which the probe 22 is fabricated. An end of the center conductor 74 is attached to a silver billet 78 which serves as one of the electrodes of the probe 22. A passageway 80 is provided for conducting an electrolyte from a reservoir 81 to a semipermeable membrane 82 which covers the outer surface of the billet 78. The membrane 82 is preferably constructed of a material such as a thin film on the order of 1 to 2 mils thickness of polytetrafluoroethylene which is permeable to dissolved oxygen but is relatively impervious to other substances found in raw sewage; the membrane 82 thus serves to filter out materials other than oxygen. The electrolyte within the passageway 80, by capillary action, wets the interface between the billet 78 and the membrane 82. The membrane 82 is secured in position by supporting members 84, 86 and 88 and is secured by a retainer spring 90 to an indentation within the supporting member 88. The membrane 82, the outer surface of the silver billet 78 and their interface wetted by the electrolyte comprise the sensing surface 34. As seen in FIG. 8, the membrane 82 is positioned from the vane 50 by a relatively short spacing in the range from approximately 1 to 5 millimeters. By way of example, it is noted that the dimensions of the probe 22 and the agitator 24 in the preferred embodiment of the invention are as follows:

The diameter of the probe 22 is approximately 7/16 inch as is the distance across the top of the vane 50, the maximum diameter of the agitator 24 is approximately 2⅛ inches, the height of the agitator 24 is approximately 15/16 inch and the height of the wall 46 of the shroud 40 is approximately ½ inch. The vane 50 is shaped from the sensing surface 34 by typically ⅛ inch and the width of the vane 50 is typically in the range from 1/16 to ⅛ inch. In the preferred embodiment of the invention, the probe 22 has been fabricated by securing the various members thereof such as the members 84, 86 and 88 by means of an adhesive adapted for joining members fabricated of polyvinylchloride material.

The upper portion of the probe 22 is in the form of an electrical wet-cell battery and is seen to comprise plates 92 which serve as an electrode and are immersed in the electrolyte within the reservoir 81. The plates 92 are coupled by a shorting bar 94 and wire 96 which, in conjunction with the center conductor 74 serve as the terminals via which an electric current is conducted to a meter 98. The electric current is generated by the probe 22 in response to the presence of dissolved oxygen at the sensing surface 34, and the meter 98 indicates the concentration of the dissolved oxygen of the raw sewage. The plates 92 are fabricated of lead and the electrolyte is typically potassium hydroxide. The upper portion of the probe 22 is sufficiently large to accommodate 100 cubic centimeters of the electrolyte. The surface area of the lead plates 92 is, preferably, at least 100 times greater than the surface area of the silver billet 78 to provide a fast electrical response time to the probe 22. The center conductor 74 is formed from a silver wire.

The chemical reactions taking place at the silver billet 78 which serves as the cathode and at the lead plates 72 which serve as the anode are as follows: At the cathode, oxygen reacts with the water to receive electrons from the electrolyte to produce hydroxyl ions. At the anode the hydroxyl ions react with the lead to produce lead hydroxide and electrons which pass via the meter 78 and the center conductor 74 to the electrolyte at the sensing surface 34. It is the release of these electrons by the chemical reaction which provides the current through the meter 98 and serves as the measure of the concentration of the oxygen dissolved in the raw sewage.

By the way of example, in supporting the probe 22 in relation to the agitator 24, there is shown in FIG. 1 a threaded insert 100 which supports the probe 22 and is threadedly secured to a horizontal shelf 102 attached to the case 28. The insert 100 is of a generally barrel shape which encloses a stem portion of the probe 22 and securely positions it along the axis of the agitator 24. The insert 100 has an upper flange 104 upon which sits the upper portion of the probe 22. Threading 106 at the interface between the shelf 102 and the insert 100 provides for a raising or lowering of the insert 100 upon rotation of the insert 100 about its axis for adjusting the spacing between the sensing surface 34 of the probe 22 and the vane 50 of the agitator 54.

It is understood that the above described embodiment of the invention is illustrative only and that modifications thereof will occur to those skilled in the art. Accordingly, it is desired that this invention is not to be limited to the embodiment disclosed herein but is to be limited only as defined by the appended claims.

What is claimed is:

1. A probe assembly for monitoring a quantity of material contained in a fluid medium, the probe assembly comprising:
   a probe having a terminus adapted to be submerged in said fluid, said terminus providing a signal in response to the presence of a preselected material within said fluid;
   a generally conically shaped agitator having a vane portion at its apex, said vane portion having an edge substantially homothetic to a cross-sectional edge of said probe terminus, said vane portion being spaced apart from said probe terminus; and
   means for rotating said agitator about an axis normal to said edge of said vane portion.

2. A probe assembly according to claim 1 further comprising a shroud member positioned about the periphery of said agitator for deflecting fluid which is urged outwardly by rotation by said agitator.

3. A probe assembly according to claim 2 wherein said terminus of said probe includes a semipermeable membrane, an electrode and means for directing electrolyte between said membrane and said electrode; and
   wherein said vane urges a portion of said fluid along the side of said membrane opposite said electrolyte.

4. A probe assembly according to claim 3 wherein said shroud member deflects said fluid in a direction generally towards said terminus of said probe.

5. A probe assembly according to claim 4 wherein the thickness of said vane portion is approximately equal to the spacing between said vane portion and said terminus of said probe.

6. A probe assembly according to claim 5 wherein said generally conical surface of said agitator has diametrically opposed concavities, each of said concavities having a substantially flat surfaced wall which joins a side of said vane portion.

7. A probe assembly according to claim 6 wherein said rotating means rotates said agitator in a direction such that the movement of one of said concavities is in a direction opposite its flat wall.

8. A probe assembly according to claim 7 in which a chamber of said probe assembly enclosing said agitator has a diameter greater than approximately twice a maximum diameter of said agitator, and in which an axial dimension of said chamber is greater than at least twice an axial dimension of said agitator.

9. In combination:
   means responsive to a quantity of material contained in a fluid medium for generating a signal indicative of said quantity of said material, said signal generating means including a filter for excluding materials other than said material; and
   urging means adapted to urge a portion of said fluid past said filter, said urging means having a cone-like shape and comprising a vane member spaced apart from said filter of said signal generating means for urging a portion of said fluid past said filter, said urging means having a substantially smooth surface with concavities therein, each of said concavities having a substantially flat wall oriented substantially normal to said smooth surface, and said urging means being rotatably mounted to permit rotation of said concavities in a direction opposite their respective flat walls.

* * * * *